(No Model.)
E. C. GRANT.
HAMMOCK HOOK.
No. 508,698.                     Patented Nov. 14, 1893.
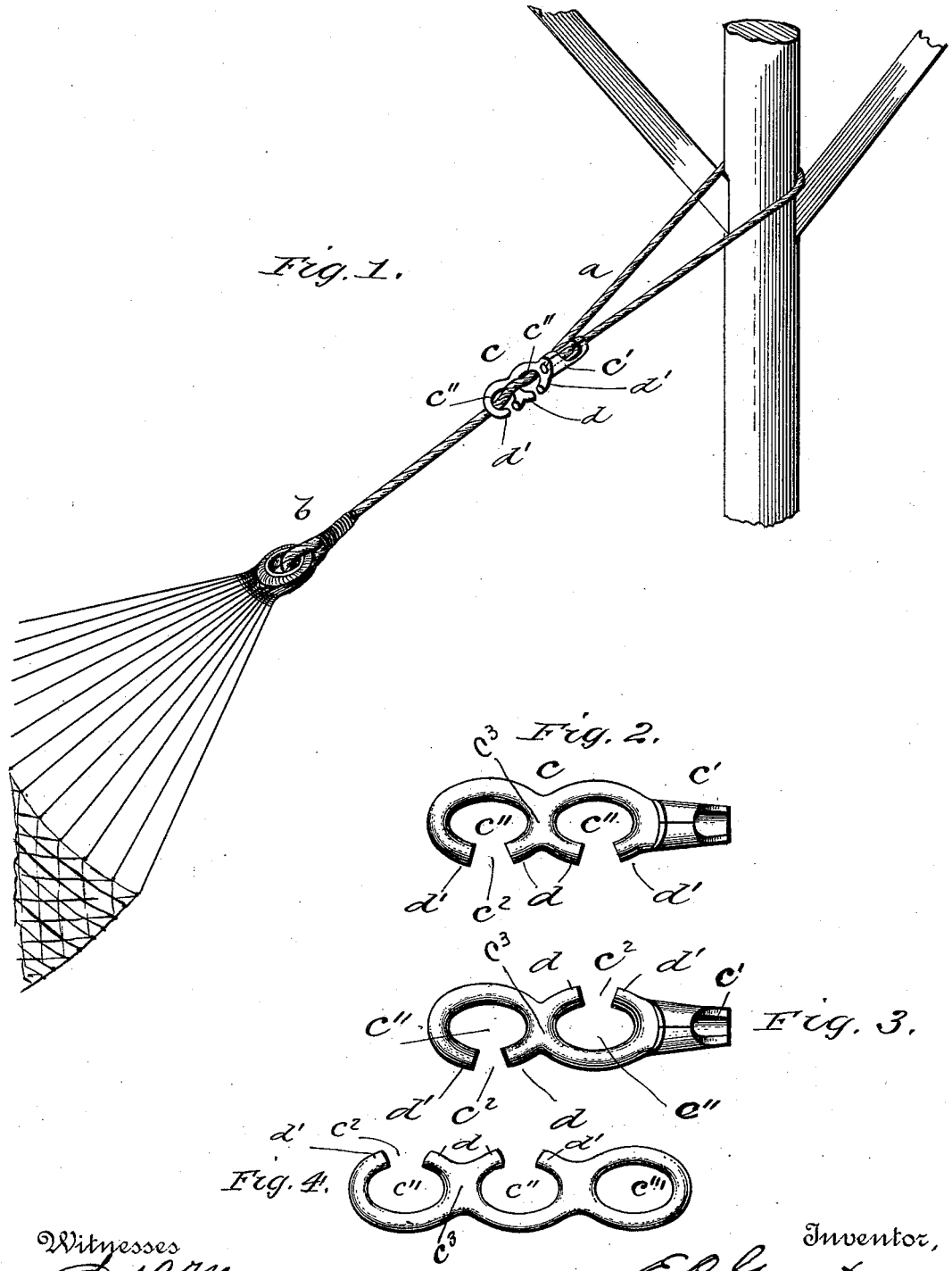

UNITED STATES PATENT OFFICE.

EMMETT C. GRANT, OF FARMER, NEW YORK.

HAMMOCK-HOOK.

SPECIFICATION forming part of Letters Patent No. 508,698, dated November 14, 1893.

Application filed June 22, 1893. Serial No. 478,537. (No model.)

*To all whom it may concern:*

Be it known that I, EMMETT C. GRANT, a citizen of the United States, residing at Farmer, in the county of Seneca and State of New York, have invented certain new and useful Improvements in Hammock-Hooks, of which the following is a specification, reference being had therein to the accompanying drawings.

This invention relates to a new and improved hammock hook, and it has for its object to provide a simple device which will be efficient in operation.

The invention consists in the novel combination and arrangement of parts hereinafter fully set forth.

In the drawings:—Figure 1 is a view showing the hook in operation. Fig. 2 is a view of the hook detached; and Figs. 3 and 4 are similar views of modified forms of the hook.

Referring to the various parts by letter, $a$ designates the rope which in the drawings is shown as the supporting rope of a hammock, but as is obvious, it may be any supporting rope. One end of the rope $a$ is secured to the ring in the hammock as shown at $b$, and its other end has secured to it a hook $c$. This hook is formed with the rope socket $c'$ at one end, and with the elliptical-shaped openings $c''$ at its other end, said openings being arranged longitudinally of the hook and adjacent to each other to form the bridge or bar $c^3$ between them. One of the side walls of each of these openings is cut away as at $c^2$, to form the hooks $d$ and $d'$ and to permit the rope to be readily inserted and withdrawn from the openings $c''$. These hooks prevent any accidental displacement of the rope from the openings $c''$. The cut out portions in the walls of the openings may be on the same side of the hook $c$, or they may be on opposite sides thereof as shown in Fig. 3 of the drawings. As many of these openings $c''$ as are found desirable may be used, as is evident, though I have found two quite sufficient.

From the foregoing when taken in connection with drawings the operation and advantages of my improved hammock hook will be manifest. The free end of the rope $a$ is secured within the rope socket $c'$, its other end being secured to the hammock. The hook $c$ is now passed around the support or post, and the hammock placed at the desired height. The rope is then passed through the cut out portions $c^2$ into the openings $c''$, said rope extending up through one opening $c''$ across the bar $c^3$ and down through the other opening $c''$, or vice-versa, through all the openings $c''$. It will thus be seen that the rope is kinked in its passage through the hooks, and the tension on it causes it to bind on the hooks $d'$ and the bridge or bar $c^3$ which prevents the rope slipping while under tension. It will thus be seen that the hook may be readily adjusted to the rope and when in position will securely hold it in its adjusted position, and when desired it may be readily removed from engagement with the rope.

The hooks $d\ d'$ are beveled outwardly as shown to facilitate the entrance of the rope into the opening $c''$.

Instead of forming the hook with the rope socket at one of its ends as shown in Figs. 2 and 3, it may be formed with the closed loop $c'''$ as shown in Fig. 4. In this construction the end of the rope $a$ is passed through the closed loop and is tied or secured therein in any other suitable manner. A great advantage of this form of hook over those shown in Figs. 2 and 3 is that the rope may be more readily attached and detached therefrom.

My device differs from prior devices in that it is exceedingly simple and easy to manufacture, and further because it has no projecting parts to become broken or to injure persons engaged about the hammock. It is also advantageous because it may be adjusted readily on the rope, its adjustment being accomplished by slacking up the rope a little and then drawing it smoothly through the loops; there is no danger of the rope not being adjusted properly in the device because the oppositely-projecting hooks $d\ d'$ (formed by splitting the closed links at one side) insure its being held in place whether the rope be interlaced from above or below. Thus forming the device of two links, integrally connected and each cut or split at one side about midway the length of the side-bar, combines the advantages of closed eyes and open hooks. These advantages make the device very simple and efficient in operation.

Having thus fully described my invention, what I claim is—

As an improved article of manufacture, a hammock-hook, consisting of two links cast integral, end to end and in the same plane, each of said links about midway the length of one of its side bars being provided with an opening $c^2$, forming the oppositely-projecting hooks $d\ d'$ whose adjacent ends are in the same plane, one of said links having formed on its outer end a rope-attaching device, as and for the purpose described.

In testimony whereof I affix my signature in presence of two witnesses.

EMMETT C. GRANT.

Witnesses:
THOMAS P. HOUSE,
WM. C. SMITH.